Patented Dec. 18, 1945

2,391,011

UNITED STATES PATENT OFFICE 2,391,011

ANTHRAQUINONE COMPOUNDS

Joseph B. Dickey and John R. Byers, Jr., Rochester, N. Y., assignors to Eastman Kodak Company, Rochester, N. Y., a corporation of New Jersey No Drawing. Application July 13, 1944, Serial No. 544,811

4 Claims. (Cl. 260—378)

This invention relates to anthraquinone compounds for textiles containing cellulose carboxylic ester rayon, and to a process for the preparation of such dyes.

The anthraquinone compound of the following formula:

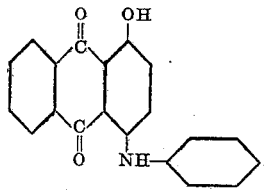

has long been known. This compound, however, is of little value as a dye for textiles containing cellulose carboxylic ester rayon, because it colors such textile materials only very poorly from an aqueous suspension of the compound. On the other hand, the anthraquinone compounds of the following general formula:

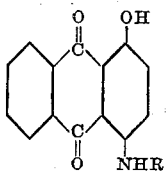

R=alkyl, such as methyl or ethyl which are also known, readily dye such textiles violet shades. The dyed textiles, however, have poor resistance to gas-fading.

Still another known anthraquinone compound having the formula:

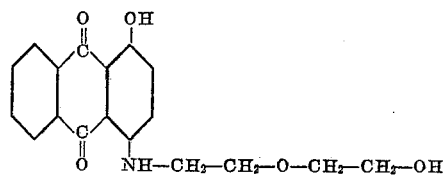

readily dyes textiles containing cellulose carboxylic ester rayons reddish-blue shades, but the dyed textiles leave much to be desired with respect to resistance to gas-fading.

We have now found new anthraquinone dyes which not only dye textiles containing cellulose carboxylic ester rayon readily to full shades, but the dyed textiles are much more resistant to gas-fading than are textiles colored with the aforesaid prior compounds, and are also as light-fast, or faster, than are dyed textiles colored with the aforesaid prior compounds. It is, accordingly, an object of our invention to provide new anthraquinone dyes and to provide a process for preparing such dyes. Other objects will become apparent hereinafter.

Our new anthraquinone compounds can be represented by the following general formula:

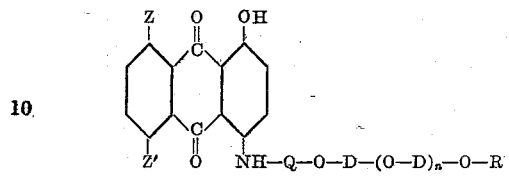

wherein $n$ represents a positive integer of from 1 to 2, D represents an ethylene group, a trimethylene group or a propylene group, R represents a member selected from the group consisting of hydrogen and an alkyl group containing from 1 to 2 carbon atoms, Q represents a phenylene group (e. g. o-phenylene and p-phenylene groups) which may carry substituents, such as halogen, an acetamino group, a methyl group, a hydroxyl group, etc., Z and Z' each represents a member selected from the group consisting of hydrogen and a hydroxyl group.

Our new dye having the formula:

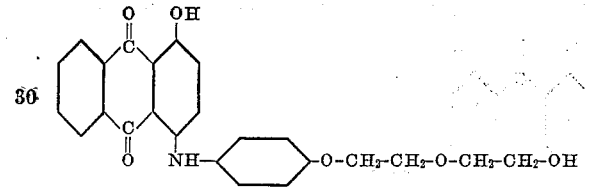

constitutes an improvement over the known dye having the formula:

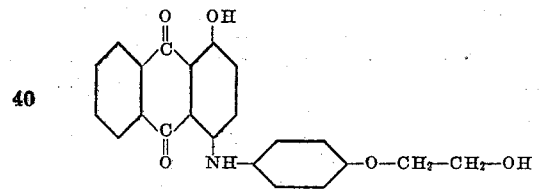

in that it requires about twice as much of the known dye to obtain a fabric of the same shade as can be obtained with our new dye. Yet our new dye is fully as fast to light and as resistant to gas-fading as is the known dye. Moreover, our new dye has a dyeing speed about 33 per cent greater than does the known dye.

In accordance with our invention we prepare our new anthraquinone compounds by condensing quinizarin (1, 4-dihydroxyanthraquinone), 1,4,5-trihydroxyanthraquinone, 1,4,8-trihydroxyanthraquinone or 1,4,5,8-tetrahydroxyanthraquinone (each in admixture with at least 10 per cent by weight of the corresponding leuco compound) with an amino compound of the following general formula:

wherein $n$ represents a positive integer of from 1 to 2, Q represents a phenylene group which may carry substituents such as halogen, an acetamino group, a methyl group, a hydroxyl group, etc., D represents an ethylene group, a trimethylene group or a propylene group and R represents a member selected from the group consisting of hydrogen and an alkyl group containing from 1 to 2 carbon atoms.

The condensations are advantageously, but not necessarily, carried out in the presence of an acid-condensing agent, e. g. boric acid, phosphoric acid, sulfuric acid, hydrochloric acid, stannous chloride, stannic chloride, etc. Boric acid is advantageously employed. The condensations are also advantageously, but not necessarily, carried out in a medium or diluent which is inert with respect to the condensation. Alcohols, especially alcohols of the formula: $C_nH_{2n+1}$ wherein $n$ represents a positive integer of from 2 to 4 are advantageously employed as the diluent. Tetrahydrofurfuryl alcohol or pyridine can be employed as the diluent.

The hydroxy anthraquinone compound, used as a starting material, is advantageously dispersed in the diluent by means of a dispersing agent, e. g. a sodium salt of a sulfonated oleic acid ester. Heat accelerates the condensations.

Following the condensation, the leuco compound is oxidized in any of the known manners of oxidizing leuco compounds, e. g. by passing air through the reaction mixture or preferably by means of an oxidizing agent, such as sodium perborate.

The following examples will serve to illustrate our new anthraquinone compounds and the manner of obtaining the same.

*Example 1. — 1-Hydroxy-4-{p-[β-(β-hydroxyethoxy)-ethoxy]-anilino}-anthraquinone*

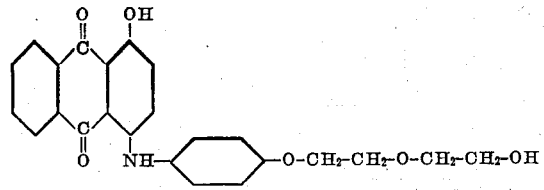

9.6 g. (0.04 mole) of quinizarin, 2.64 g. (0.011 mole) of leucoquinizarin, 6 g. of boric acid, 9.8 g. (0.05 mole) of p-[β-(β-hydroxyethoxy)-ethoxy]-aniline and 50 g. of ethyl alcohol were refluxed together for 20 hours on a steam bath. 3 g. of sodium perborate dissolved in 25 cc. of water were then added to the reaction mixture to oxidize the leuco compound. The reaction mixture was then cooled to about 25° C. and the above formulated dye was filtered off. The dye was washed with ethyl alcohol and then with water. To remove excess quinizarin, the wet dye was placed in 375 cc. of water containing 28 g. of sodium hydroxide and the mixture was brought to a boil. The violet-colored slurry was filtered while hot, and the resulting dark blue dye was washed with hot water until free from alkali. The yield of dry dye was 13.4 g. The dye melted at 95° to 100° C.

In a similar manner, 1-hydroxy-4-{o-[β-(β-hydroxyethoxy)-ethoxy] - anilino} - anthraquinone (melting at 120° to 140° C.), 1-hydroxy-4-{o-chloro-p - [β-(β-hydroxyethoxy) - ethoxy]-anilino} - anthraquinone, 1-hydroxy-4-{p-[γ-(γ-hydroxypropoxy) -propoxy]-anilino} - anthraquinone and 1 - hydroxy-4-{p-acetamino-o-[β-(β-hydroxyethoxy)-ethoxy]-anilino}-anthraquinone can be prepared.

*Example 2.—1 - Hydroxy - 4 - {p-[β-(β - ethoxyethoxy)-ethoxy]-anilino}-anthraqinone*

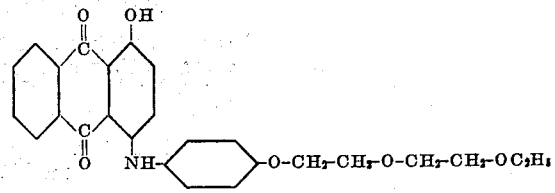

9.6 g. (0.04 mole) of quinizarin, 2.64 g. (0.011 mole) of leucoquinizarin, 6 g. of boric acid, 11 g. (0.05 mole) of p-[β-(β-ethoxyethoxy)-ethoxy]-aniline and 50 g. of ethyl alcohol were refluxed together for about 20 hours on a steam bath. 3 g. of sodium perborate dissolved in 25 cc. of water were then added to the reaction mixture to oxidize the leuco compound. The reaction mixture was then cooled to about 25° C. and the above formulated dye was filtered off. The dye was washed with ethyl alcohol and then with water. To remove excess quinizarin, the wet dye was placed in 375 cc. of water containing 28 g. of sodium hydroxide and the mixture was brought to a boil. The resulting slurry was filtered hot, and the resulting blue dye was washed with hot water until free from alkali. The yield was 14 g. The dye melted at 90° to 105° C.

In a similar manner, 1-hydroxy-4-{p-[β-(β-methoxyethoxy) - ethoxy]-anilino} - anthraquinone can be prepared.

*Example 3.—1,5,8 - Trihydroxy-4-{p - [β-(β-hydroxyethoxy)-ethoxy]-anilino}-anthraquinone*

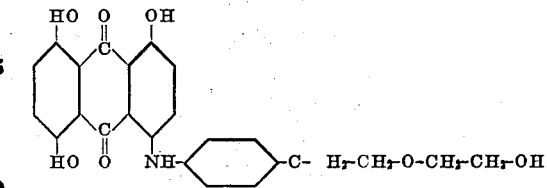

10.88 g. (0.04 mole) of 1,4,5,8-tetrahydroxy anthraquinone, 3.01 g. (0.01 mole) of leuco-1,4,5,8-tetrahydroxy-anthraquinone and 6 g. of boric acid were placed in 50 cc. of isopropanol. The mixture was heated to boiling under reflux and while boiling was continued, 9.8 g. (0.05 mole) of p-[β-(β-hydroxyethoxy)-ethoxy]-aniline dissolved in 25 cc. of isopropanol were added dropwise, with stirring, over a period of 10 hours. Stirring and boiling were continued for 10 hours after the addition. 3 g. of sodium perborate dissolved in 25 cc. of water were then added to the reaction mixture to oxidize the leuco compound. The reaction mixture was then cooled, whereupon the above formulated dye crystallized out. It was filtered off, washed with ethyl alcohol and then with water. To remove excess 1,4,5,8-tetrahydroxyanthraquinone, the wet dye was brought to a boil in 375 cc. of water containing 28 g. of sodium hydroxide. The resulting slurry was filtered hot and the resulting blue dye was washed with hot water until free from alkali. The dye melted at 170° to 175° C.

In a similar manner, 1,5,8-trihydroxy-4-{o-[β-(β-hydroxyethoxy)-ethoxy]-anilino}- anthraquinone and 1,5,8-trihydroxy-4-{o-chloro-p-[γ-(γ-hydroxypropoxy)-propoxy] - o- anilino}-anthraquinone and 1,5-dihydroxy-4-{p-[β-(β-hydroxyethoxy)-ethoxy]-anilino}-anthraquinone can be prepared.

*Example 4.—1-Hydroxy-4-<p-{β-[β-(β-hydroxyethoxy)-ethoxy]-ethoxy} - anilino> - anthraquinone*

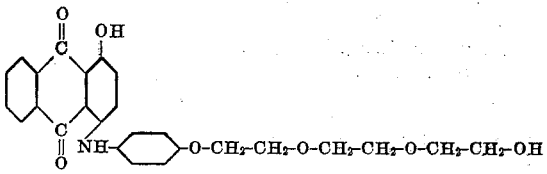

9.6 g. (0.04 mole) of quinizarin, 2.64 g. (0.011 mole) of leucoquinizarin, 6 g. of boric acid, 12 g. (0.05 mole) of p - {β - [β - (β - hydroxyethoxy)-ethoxy]-ethoxy}-aniline and 50 g. of ethyl alcohol were refluxed together for about 20 hours on a steam bath. 3 g. of sodium perborate dissolved in 25 cc. of water were then added to the reaction mixture to oxidize the leuco compound. The reaction mixture was then cooled to about 25° C. and the above formulated dye was filtered off. The dye was washed with ethyl alcohol and then with water. To remove excess quinizarin, the wet dye was placed in 375 cc. of water containing 28 g. of sodium hydroxide and the resulting mixture was brought to a boil. The resulting slurry was filtered hot, and the blue dye was washed with hot water until free from alkali. The dye melted at 115° to 120° C.

In a similar manner, 4-<p-{β-[β-(β-ethoxyethoxy)-ethoxy]-ethoxy}-anilino> - anthraquinone can be prepared.

The aniline derivatives of the following formula:

H₂N—Q—O—D—(O—D)ₙ—O—R wherein n represents a positive integer of from 1 to 2, Q represents a phenylene group, D represents an ethylene group, a trimethylene group or a propylene group and R represents an alkyl group of from 1 to 2 carbon atoms can be prepared by condensing a chloronitrobenzene derivative of the following formula:

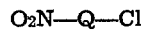
O₂N—Q—Cl wherein Q represents a phenylene group which may carry substituents such as halogen, an acetamino group, a methyl group or a hydroxyl group, etc., with a sodium alcoholate of the following formula:

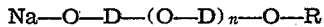
Na—O—D—(O—D)ₙ—O—R wherein D represents an ethylene group, a trimethylene group or a propylene group, n represents a positive integer of from 1 to 2, and R represents hydrogen or an alkyl group containing from 1 to 2 carbon atoms, and then reducing the resulting nitro compound with hydrogen, in the presence of a nickel catalyst, especially of the Raney type, in methanol, at from 80° to 100° C. in an autoclave under a hydrogen pressure of 400 to 1800 pounds per square inch. The initial condensation of the chloronitro compound and the sodium alcoholate is advantageously carried out at 90° to 100° C. for about 20 hours. The sodium alcoholates can be prepared by adding sodium to the alcohols of the formula:

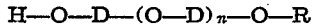
H—O—D—(O—D)ₙ—O—R wherein D represents an ethylene group, a trimethylene group or a propylene group, n represents a positive integer of from 1 to 2, and R represents hydrogen or an alkyl group of from 1 to 2 carbon atoms. Many of these alcohols are very well known substances and readily available on the market, e. g. diethylene glycol and triethylene glycol and the monomethyl and monoethyl ethers of these glycols. Dipropylene glycol is also available on the market. Tripropylene glycol can be prepared by reacting 10 moles of dipropylene glycol with one mole of sodium and condensing the resulting mixture with one mole of propylene chlorohydrin. Di-trimethylene glycol can be prepared by reacting 10 moles of trimethylene glycol with one mole of sodium and condensing the resulting mixture with trimethylene chlorohydrin. Tri-trimethylene glycol can be prepared by reacting 10 moles of di-trimethylene glycol with one mole of sodium and condensing the resulting mixture with one mole of trimethylene chlorohydrin. The monomethyl and monoethyl ethers of di- and tri-propylene glycol and of di-trimethylene glycol and tri-trimethylene glycol can be prepared by reacting 5 to 10 moles of the glycol with sodium and condensing the resulting mixture with methyl iodide or ethyl iodide.

The anthraquinone dyes of our invention are especially useful for the coloration of organic derivatives of cellulose which include the hydrolyzed, as well as the unhydrolyzed, cellulose carboxylic esters, such as cellulose acetate, cellulose propionate and cellulose butyrate, and the hydrolyzed, as well as the unhydrolyzed, mixed carboxylic esters of cellulose, such as cellulose acetate-propionate and cellulose acetate-butyrate, and the cellulose ethers, such as methyl cellulose, ethyl cellulose and benzyl cellulose. Our new dyes are also useful for the coloration of cellulose esters and cellulose ether lacquers, as well as lacquers made from polyvinyl compounds. Our new dyes can be used to color nylons and textiles prepared therefrom.

The anthraquinone dyes of our invention can be applied to the coloration of fabrics made of or containing organic derivatives of cellulose, such as cellulose acetate rayon, by the known dyeing or printing methods. In accordance with the known dispersion method of dyeing, the anthraquinone dyes are first ground to a fine powder, intimately mixed with a suitable dispersing or solubilizing agent, following which the resulting mixture is added to water or a dilute solution of soap in water to form an aqueous dye bath. The textile materials are then immersed in such a dye bath in accordance with known procedures. Suitable dispersing or solubilizing agents include soap, sulforicinoleic acid, the alkali metal salts of sulforicinoleic acid, sulfonated oleic, stearic or palmitic acid or salts thereof, such as the sodium or ammonium salts. For printing, our new dyes are advantageously ground with a suitable dispersing agent, such as a sodium lignin sulfonate and the resulting printing mixture is then applied to the textile materials, in accordance with known printing methods.

In accordance with the recommendations of Chemical Abstracts, the term propylene is intended to mean the group having the following formula:

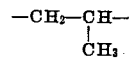
—CH₂—CH—
          |
          CH₃ and the term trimethylene is intended to mean the group having the following formula:

—CH₂—CH₂—CH₂—

What we claim and desire to be secured by Letters Patent of the United States is:

1. The anthraquinone compounds having the following general formula:

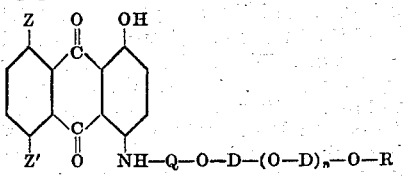

wherein $n$ represents a positive integer of from 1 to 2, Q represents a phenylene group, D represents a member selected from the group consisting of ethylene, trimethylene and propylene groups, R represents a member selected from the group consisting of hydrogen and an alkyl group containing from 1 to 2 carbon atoms, and Z and Z' each represents a member selected from the group consisting of hydrogen and a hydroxyl group.

2. The anthraquinone compound having the following formula:

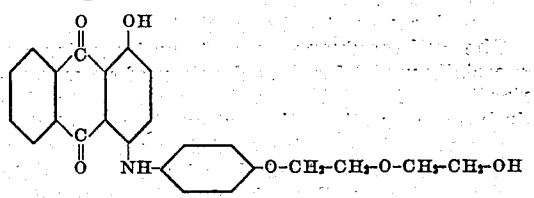

3. The anthraquinone compound having the following formula:

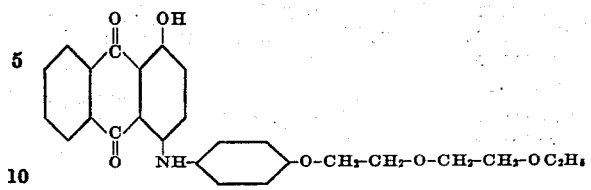

4. The anthraquinone compound having the following formula:

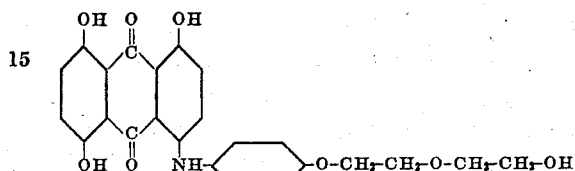

JOSEPH B. DICKEY.
JOHN R. BYERS, Jr.